United States Patent
Oveyssi

(10) Patent No.: US 7,327,537 B1
(45) Date of Patent: Feb. 5, 2008

(54) DISK DRIVE INCLUDING A MAGNETIC ELEMENT SUPPORT WITH A FIRST TRANSITION SECTION ANGULARLY LATERAL TO A COIL AND A SECOND TRANSITION SECTION RADIALLY BEYOND THE COIL

(75) Inventor: Kamran Oveyssi, San Jose, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 426 days.

(21) Appl. No.: 11/057,678

(22) Filed: Feb. 14, 2005

(51) Int. Cl.
*G11B 5/55* (2006.01)
*G11B 21/08* (2006.01)

(52) U.S. Cl. .................................................. 360/264.7
(58) Field of Classification Search ............. 360/264.7, 360/264.8, 264, 9
See application file for complete search history.

(56) References Cited

U.S. PATENT DOCUMENTS

| | | | |
|---|---|---|---|
| 5,585,679 A | 12/1996 | Bracken et al. | |
| 5,862,020 A * | 1/1999 | Lee ......................... | 360/264.7 |
| 5,905,609 A | 5/1999 | Butler et al. | |
| 6,421,208 B1 | 7/2002 | Oveyssi | |
| 6,462,914 B1 * | 10/2002 | Oveyssi et al. ........... | 360/264.8 |
| 6,462,941 B1 | 10/2002 | Hulick et al. | |
| 6,507,462 B1 | 1/2003 | Gibbs et al. | |
| 6,529,351 B1 * | 3/2003 | Oveyssi et al. ........... | 360/264.8 |
| 6,549,380 B2 * | 4/2003 | Kazmierczak ........... | 360/264.8 |
| 7,161,768 B1 * | 1/2007 | Oveyssi ................... | 360/264.8 |
| 2001/0048576 A1 | 12/2001 | Kazmierczak | |
| 2004/0105190 A1 * | 6/2004 | Kim et al. ................ | 360/264.7 |
| 2005/0099734 A1 * | 5/2005 | Rafaelof ................. | 360/264.8 |

FOREIGN PATENT DOCUMENTS

JP          05041044 A          2/1993

* cited by examiner

*Primary Examiner*—Tianjie Chen
(74) *Attorney, Agent, or Firm*—Stetina, Brunda, Garred & Brucker

(57) ABSTRACT

A disk drive includes a base, a disk rotatably coupled to the base, and a rotary actuator coupled to the base adjacent the disk. The rotary actuator is configured to pivot about an axis of rotation, and includes a coil. The disk drive further includes a magnetic element support coupled to the base. The magnetic element support includes first and second plate sections cooperatively formed to receive the coil. The magnetic element support includes a first transition section formed between the plate sections for forming a first magnetic flux path. The first transition section disposed angularly lateral with respect to the coil and the axis of rotation. The magnetic element support includes a second transition section formed between the plate sections for forming a second magnetic flux path. The second transition section being disposed radially beyond the coil with respect to the axis of rotation.

11 Claims, 11 Drawing Sheets

DISK DRIVE INCLUDING A MAGNETIC ELEMENT SUPPORT WITH A FIRST TRANSITION SECTION ANGULARLY LATERAL TO A COIL AND A SECOND TRANSITION SECTION RADIALLY BEYOND THE COIL

CROSS REFERENCE TO RELATED APPLICATIONS

This application is related to U.S. application Ser. No. 11/057,565, entitled DISK DRIVE INCLUDING MAGNETIC ELEMENT SUPPORT WITH PRIMARY AND SECONDARY MAGNETIC FLUX PATHS, filed concurrently herewith on Feb. 14, 2005, incorporated herein by reference.

BACKGROUND OF THE INVENTION

1. Field of the Invention

The present invention relates generally to disk drives, and in particular to a disk drive including a magnetic element support with a first transition section radially lateral to an actuator coil and a second transition section radially beyond the actuator coil.

2. Description of the Prior Art

The typical hard disk drive includes a head disk assembly (HDA) and a printed circuit board assembly (PCBA) attached to a disk drive base of the HDA. The head disk assembly includes at least one disk (such as a magnetic disk), a spindle motor for rotating the disk, and a head stack assembly (HSA). The printed circuit board assembly includes a servo control system in the form of a disk controller for generating servo control signals. The head stack assembly includes at least one transducer head, typically several, for reading and writing data from and to the disk. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit assembly. A conventional "rotary" or "swing-type" actuator assembly typically includes a rotary actuator having an actuator body. The actuator body has a bore and a pivot bearing cartridge engaged within the bore to facilitate rotational movement of the actuator assembly between limited positions about an axis of rotation. A coil support extends from one side of the actuator body. An actuator coil is supported by the coil support and is configured to interact with one or more permanent magnetic elements, typically a pair, to form a voice coil motor. One or more actuator arms extend from an opposite side of the actuator body. Each head gimbal assembly includes a transducer head, typically a magneto-resistive ("MR") head, which is distally attached to each of the actuator arms. Each magnetic disk includes opposing disk surfaces. Data may be recorded along data annular regions on a single disk surface or both. As such, the head stack assembly may be pivoted such that each transducer head is disposed adjacent to the various data annular regions from adjacent to the outer diameter to the inner diameter of each disk.

As mentioned above, typically a pair of magnetic elements is used to form a voice coil motor. Typically each of the magnetic elements is supported by a magnetic element support plate or mount. The plates may have bent ends that contact each other to form a single loop enclosing the magnetic elements. A magnetic flux path extends in a single loop through the magnetic element support plates and between the two magnetic elements. A leg of the coil is positioned between the two magnetic elements. Current passing through the coil results in a torque being applied to the rotary actuator. A change in direction of the current through the coil results in a change in direction of the torque applied to the rotary actuator.

Accordingly, there is a need in the art for an improved magnetic element support configuration in comparison to the prior art.

SUMMARY OF THE INVENTION

An aspect of the present invention can be regarded as a disk drive including a disk drive base, a disk rotatably coupled to the disk drive base, and a rotary actuator coupled to the disk drive base adjacent the disk. The rotary actuator is configured to pivot about an axis of rotation, and includes a coil. The disk drive further includes a magnetic element support coupled to the disk drive base. The magnetic element support includes a first plate section and a second plate section disposed generally parallel to the first plate section. The first and second plate sections are cooperatively formed to receive the coil between the first and second plate sections. The magnetic element support includes a first transition section formed between the first and second plate sections for forming a first magnetic flux path between the first and second plate sections. The first transition section disposed angularly lateral with respect to the coil and the axis of rotation. The magnetic element support includes a second transition section formed between the first and second plate sections for forming a second magnetic flux path between the first and second plate sections. The second transition section being disposed radially beyond the coil with respect to the axis of rotation.

According to various embodiments, the first plate section, the second plate section, the first transition section, and the second transition section may be formed of a unitary piece of material. The second transition section may be integrally formed with the first and second plate sections. The rotary actuator may further include a coil support, and the coil may be supported by the coil support. The disk drive may further include a first magnetic element supported by the first plate section and a second magnetic element supported by the second plate section facing the first magnetic element with the coil disposed between the first and second plate sections.

The first magnetic element may include two poles, and the second magnetic element may include two poles. The first and second magnetic elements may have poles with opposite polarities facing each other. The magnetic element support may be formed of steel and may be metal plated. The first transition section may include a distal end, and the distal end may be faced towards the first plate section. According to another embodiment, the first transition section may include a contact section that terminates at a distal end with the distal end faced along the first plate section and the contact section faced towards the first plate section. The second transition section may be curved. The second transition section may be C-shaped.

DESCRIPTION OF THE PREFERRED EMBODIMENTS

Figure 1:
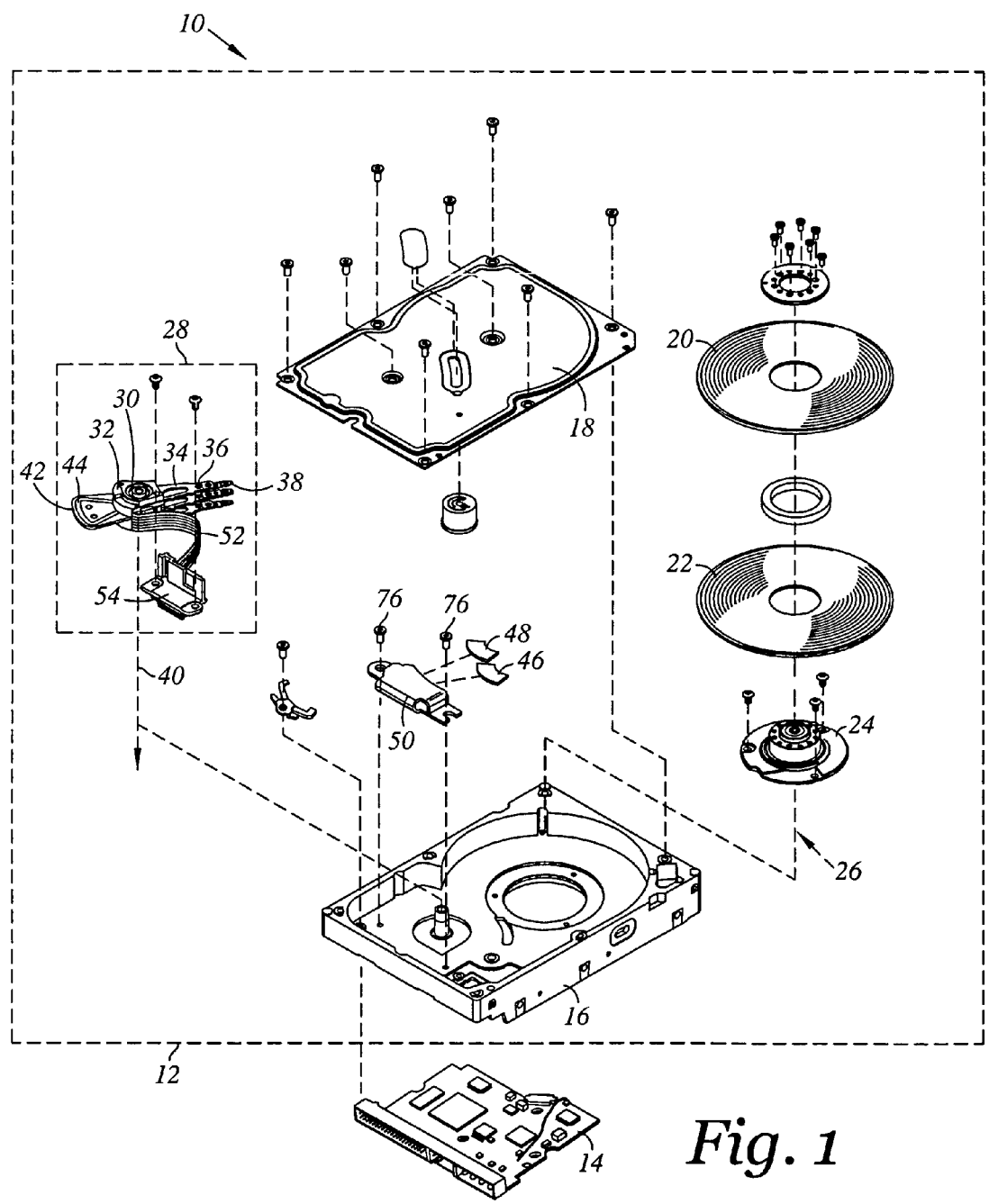
FIG. 1 is an exploded perspective view of a disk drive including a magnetic element support in accordance with an aspect of the present invention.

Referring now to the drawings wherein the showings are for purposes of illustrating preferred embodiments of the present invention only, and not for purposes of limiting the same, FIGS. 1, 2, 2a, 3, 3a, 4, 4a, 5, 6, 6a, 7, 8, 8a, 9, 9a, 10, 10a, 11, 12, 12a, and 13 illustrate a disk drive and a magnetic element support in accordance with the aspects of the present invention.

Figure 2:
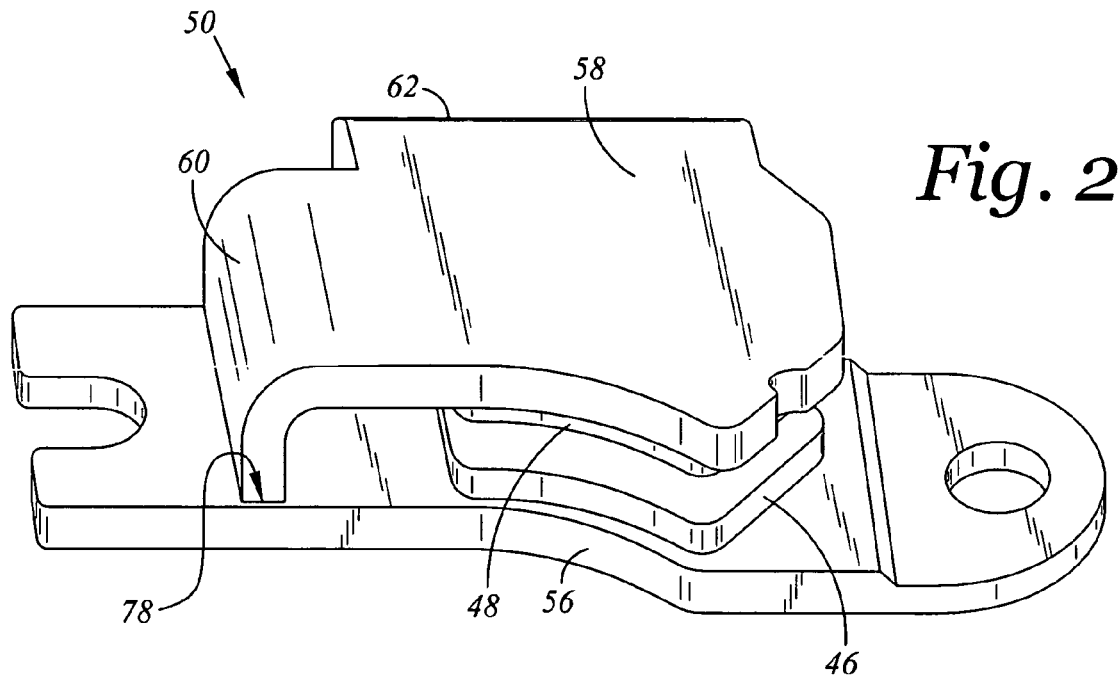
FIG. 2 is an enlarged top perspective view of the magnetic element support of FIG. 1 as shown with two magnetic elements.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. FIG. 2 depicts the disk drive 10 as assembled without the cover 18. The disk drive base 16 and the cover 18 collectively house disks 20, 22. Each disk 20, 22 contains a plurality of tracks for storing data. The head disk assembly 12 further includes a spindle motor 24 for rotating the disks 20, 22 about a disk rotation axis 26. The head disk assembly 12 further includes a head stack assembly 28 rotatably attached to the disk drive base 16 in operable communication with the disks 20, 22. The head stack assembly 28 includes a rotary actuator 30.

The rotary actuator 30 includes an actuator body 32 and actuator arms (for ease of illustration, only a topmost one being denoted 34) that extend from the actuator body 32. Distally attached to the actuator arms 34 are suspension assemblies (the topmost one denoted 36). The suspension assemblies 36 respectively support sliders (the topmost one denoted 38). Each of the sliders 38 includes a transducer head. The suspension assemblies 36 with the sliders 38 are referred to as head gimbal assemblies. It is contemplated that the number of actuator arms and suspension assemblies may vary depending upon the number of disks and disk surfaces utilized.

The actuator body 32 includes a bore, and the rotary actuator 30 further includes a pivot bearing cartridge engaged within the bore for facilitating the actuator body 32 to rotate between limited positions about an axis of rotation 40. The actuator 30 further includes a coil support 42 that extends from one side of the actuator body 32 opposite the actuator arms 34. The coil support 42 is configured to support a coil 44.

First and second of magnetic elements 46, 48 are supported by a magnetic element support 50 of the present invention which is attached to the disk drive base 16. The coil 44 interacts with the first and second magnetic elements 46, 48 to form a voice coil motor for controllably rotating the actuator 30. The head stack assembly 28 further includes a flex circuit assembly 52 and a cable connector 54. The cable connector 54 is attached to the disk drive base 16 and is disposed in electrical communication with the printed circuit board 14. The flex circuit assembly 52 supplies current to the actuator coil 44 and carries signals between the transducer heads of the sliders 38 and the printed circuit board assembly 14.

An aspect of the present invention can be regarded as a disk drive 10 including the disk drive base 16, a disk (such as disk 20) rotatably coupled to the disk drive base 16, and the rotary actuator 30 coupled to the disk drive base 16 adjacent the disk 20. The rotary actuator 30 is configured to pivot about the axis of rotation 40, and includes the coil 44. The disk drive 10 further includes the magnetic element support 50 coupled to the disk drive base 16.

Figure 3:
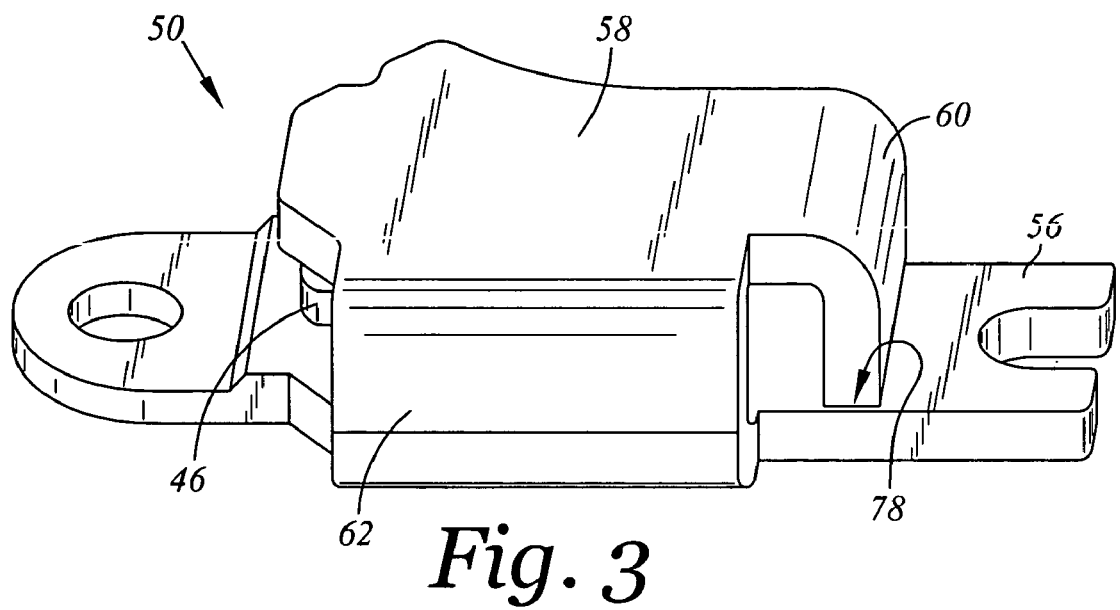
FIG. 3 is the magnetic element support and a magnetic element of FIG. 2 as shown from an opposite viewing angle.
Figure 4:
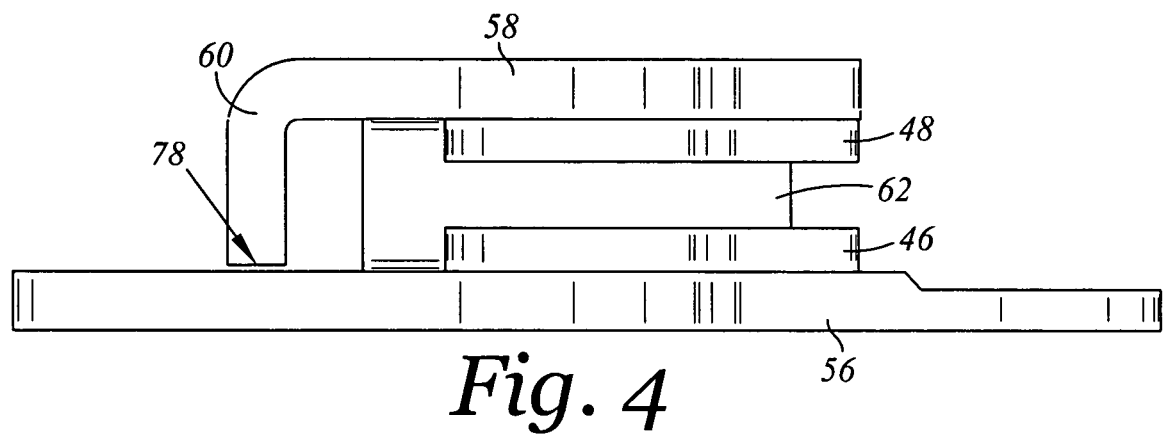
FIG. 4 is a side view of the magnetic element support and the magnetic elements of FIG. 2.
Figure 5:
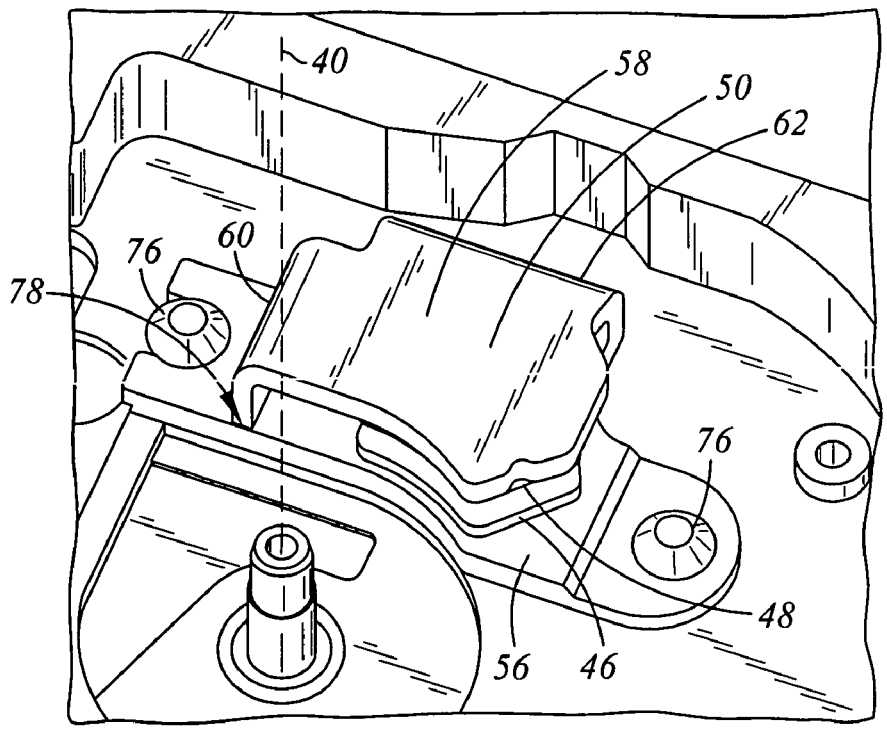
FIG. 5 is an enlarged perspective view of a portion of a disk drive base, the magnetic element support, and a magnetic element of the FIG. 1 as installed.
Figure 6:
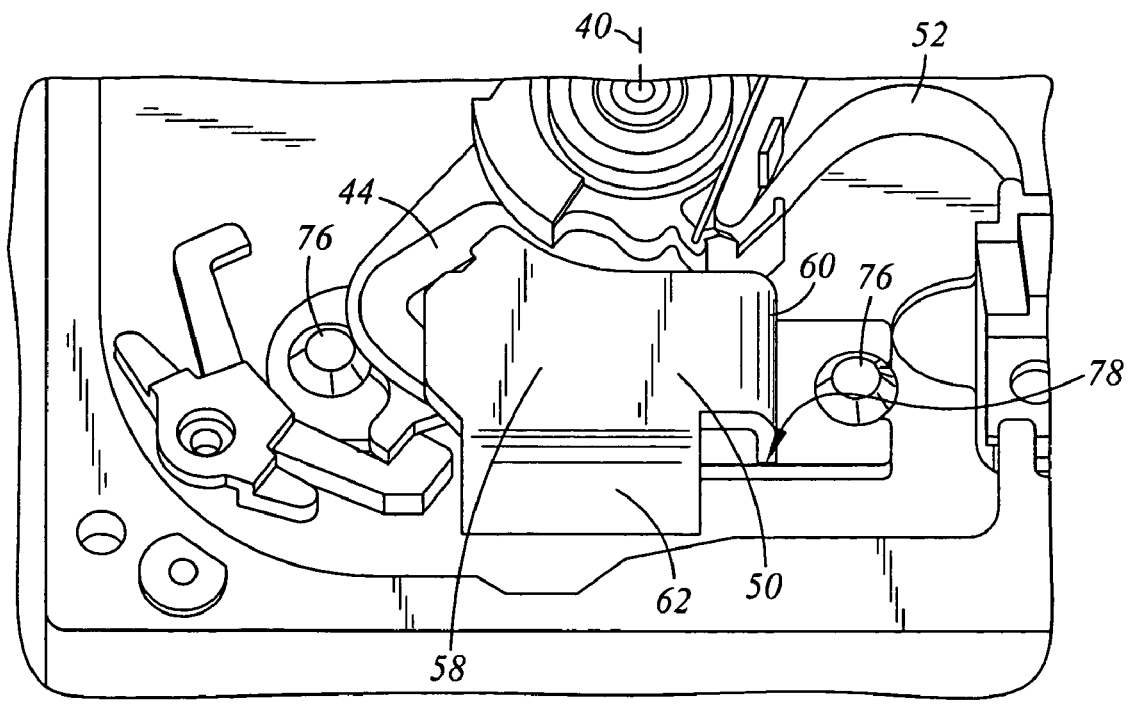
FIG. 6 is an enlarged perspective view of a portion the disk drive base, a portion of a rotary actuator, and the magnetic element support of FIG. 1 as installed.

Referring additionally now to FIGS. 2-4 there is depicted various views of the magnetic element support 50. Further, FIG. 5 is an enlarged perspective view of a portion of a disk drive base 16, the magnetic element support 50, and the first and second magnetic elements 46, 48 of the FIG. 1 as installed. FIG. 6 is an enlarged perspective view of a portion the disk drive base 16, a portion of a rotary actuator 30, and the magnetic element support 50 of FIG. 1 as installed.

The magnetic element support 50 includes a first plate section 56 and a second plate section 58 disposed generally parallel to the first plate section 56. The first and second plate sections 56, 58 are cooperatively formed to receive the coil 44 between the first and second plate sections 56, 58.

The magnetic element support 50 further includes a first transition section 60 formed between the first and second plate sections 56, 58 for forming a first magnetic flux path between the first and second plate sections 56, 58. The first transition section 60 is disposed angularly lateral with respect to the coil 44 and the axis of rotation 40. The magnetic element support 50 further includes a second transition section 62 formed between the first and second plate sections 56, 58 for forming a second magnetic flux path between the first and second plate sections 56, 58. The second transition section 62 is disposed radially beyond the coil 44 with respect to the axis of rotation 40.

As mentioned above, the first transition section 60 is disposed angularly lateral with respect to the coil 44 and the axis of rotation 40. In this regard, at least some portion of the first transition section 60 has a radial distance from the axis of rotation 40 as some portion of the coil 44.

As further mentioned above, the second transition section 62 is disposed radially beyond the coil 44 with respect to the axis of rotation 40. In this regard, the second transition section 62 is radially further than the coil 44 with regard to the axis of rotation 40. The coil 44 is disposed between the second transition section 62 and the axis of rotation 40. Such configuration facilitates the two magnetic flux paths without adding structure to both lateral sides of the first and second plate sections 56, 58. This may be desirable where space specifications limit the lateral geometry of the magnetic element support 50. Further, by positioning the second transition section 62 radially further than the coil 44 rather than radially lateral to the coil 44, this allows for ease of assembly of the rotary actuator 30 in relation to the magnetic element support 50 and the disk drive base 16. This is due to the open lateral side.

Figure 2A:
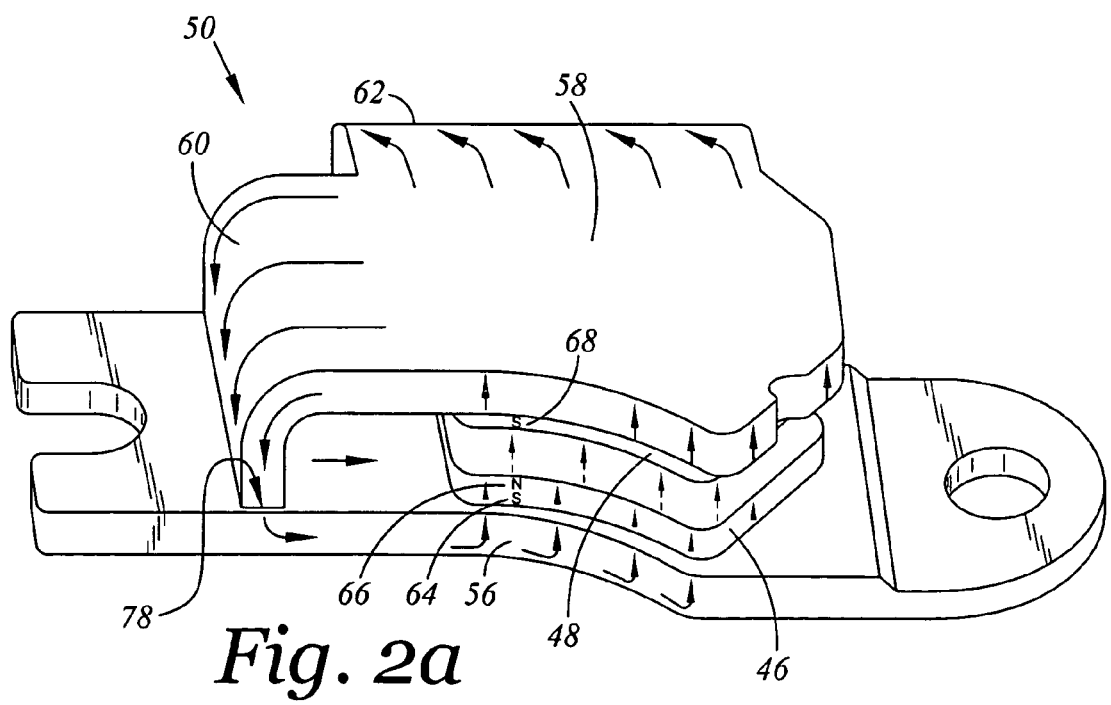
FIG. 2a is the magnetic element support and the magnetic element of FIG. 2 as shown with magnetic flux lines.
Figure 4A:
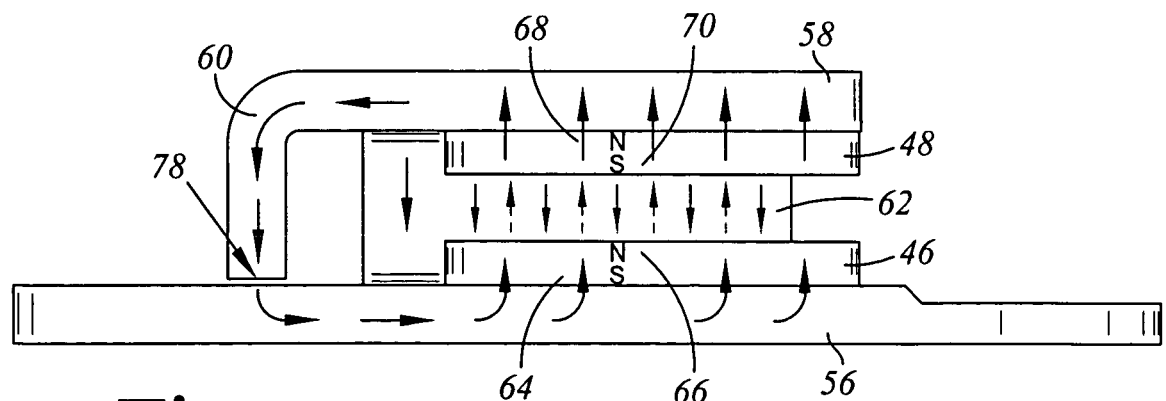
FIG. 4a is the magnetic element support and the magnetic elements of FIG. 4 as shown with magnetic flux lines.
Figure 6A:
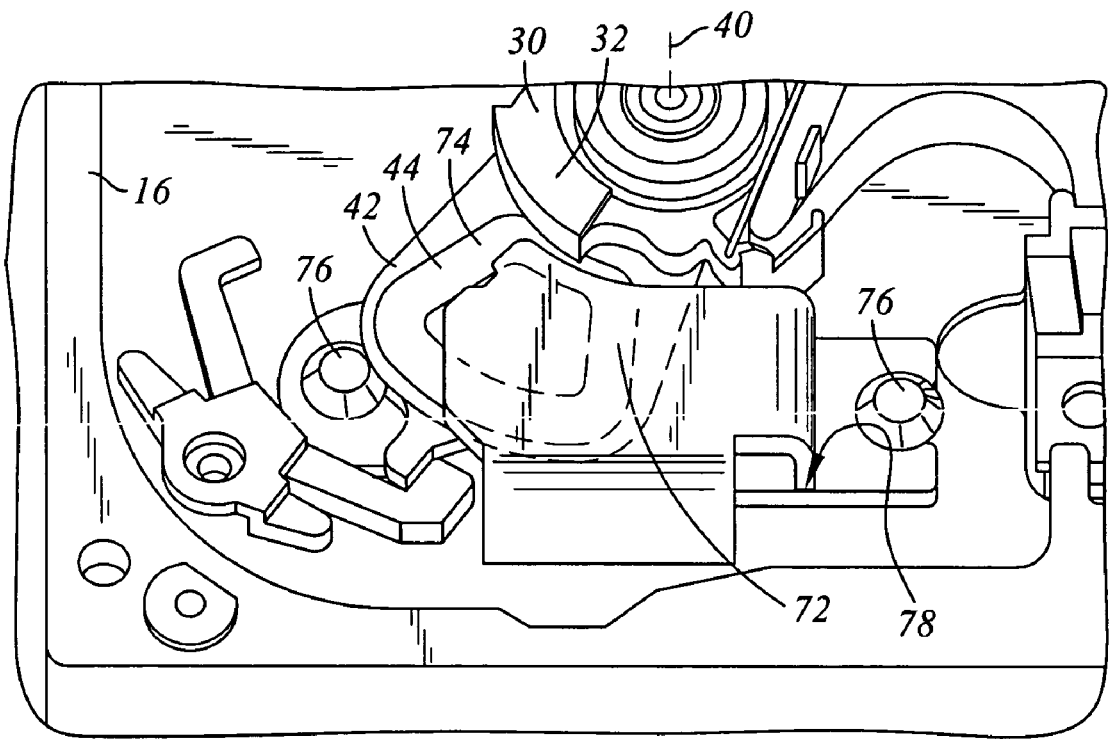
FIG. 6a is the enlarged perspective view of the portion the disk drive base, the portion of a rotary actuator, and the magnetic element support of FIG. 6 with a portion of the rotary actuator shown in phantom lining.

According to various embodiments, the first magnetic element 46 is supported by the first plate section 56 and the second magnetic element 48 is supported by the second plate section 58 facing the first magnetic element 46 with the coil 44 disposed between the first and second plate sections 56, 58 (such as shown in FIGS. 6, 6a). As seen in FIGS. 2a and 4a, the first magnetic element 46 may include two poles 64, 66, and the second magnetic element 48 may include two poles 68, 70. In the configuration shown, the first and second magnetic elements 46, 48 may have poles 66, 68 with opposite polarities facing each other. In this regard, the pole 66 is indicated as having an N-type polarity and the pole 68 is indicated as having an S-type polarity.

As shown in FIG. 6a, the coil 44 includes a coil active leg 72 and a coil inactive leg 74. The coil active leg 72 is positioned between the first and second magnetic elements 46, 48. In this configuration, the coil inactive leg 74 is maintained outside (i.e., not between) the first and second magnetic elements 46, 48 throughout the full range of operable motion the rotary actuator 30. This is to prevent any torque contributions resulting from exposure of the coil inactive leg 74 from mitigating the torque associated with the coil active leg 72.

Figure 3A:
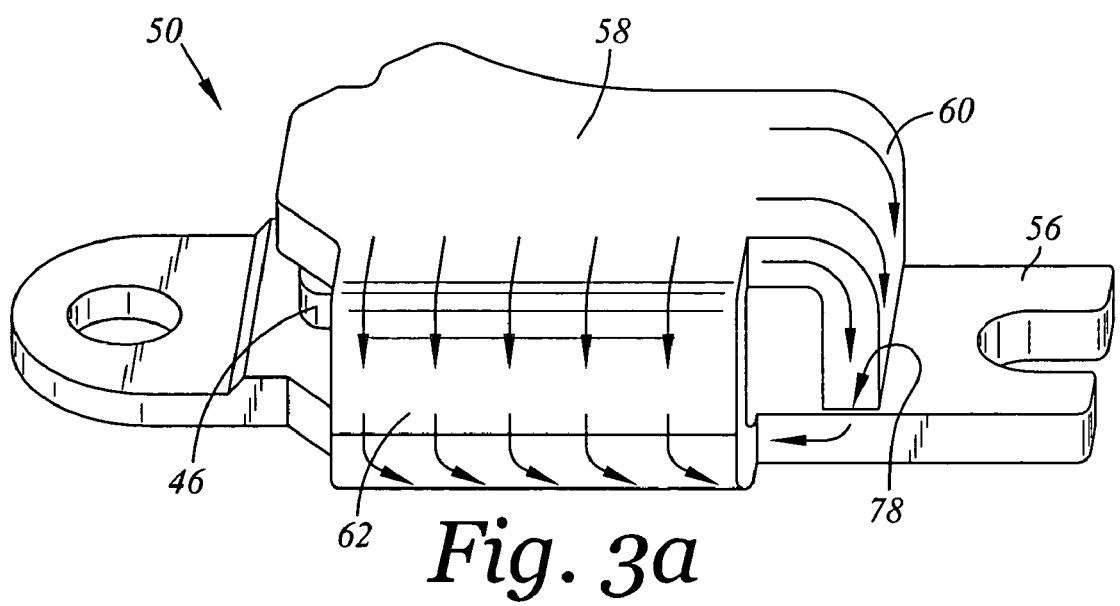
FIG. 3a is the magnetic element support and the magnetic element of FIG. 3 as shown with magnetic flux lines.

As mentioned above a first magnetic flux path is formed between the first and second plate sections 56, 58. As shown in FIGS. 2a, 3a, and 4a magnetic flux lines are indicated (solid lines symbolically indicating the direction of magnetic flux flowing through the magnetic element support 50 and dashed lines symbolically indicating the direction of magnetic flux flowing through the airspace adjacent the magnetic element support 50). The first magnetic flux path extends from the second magnetic element 48, to the second plate section 58, to the first transition section 60, to the first plate section 56, and to the first magnetic element 46. Finally, the first magnetic flux path extends between the first magnetic element 46 and the second magnetic element 48 to complete a loop.

Similarly, a second magnetic flux path is formed between the first and second plate sections 56, 58. The second magnetic flux path extends from the second magnetic element 48, to the second plate section 58, to the second transition section 62, to the first plate section 56, and to the first magnetic element 46. Finally, the second magnetic flux path extends between the first magnetic element 46 and the second magnetic element 48 to complete a loop. The coil active leg 72 is positioned between the first and the second magnetic elements 46, 48 within both the first and second magnetic flux paths. Advantageously, the two magnetic flux paths allow for an increase in the amount of magnetic material and magnetic flux flowing between the first and second magnetic elements 46, 48 in comparison to a configuration with only a single magnetic flux path for a given thickness of the magnetic element support 50. In addition, utilization of two magnetic flux paths tends to mitigate flux leakage in comparison to a configuration with only a single magnetic flux path for a given thickness of the magnetic element support 50.

It is contemplated that any number of magnetic element configurations may be chosen from those that are well known to one of ordinary skill in the art. Thus, it is understood that the present invention may be practiced with configurations having a single magnetic element or additional magnetic elements and with various magnetic polarity arrangements. Further, the present invention may be practiced with any number of coil arrangements which may include multiple coils and/or coil segments and various coil geometries. Likewise, the coil support arrangement may be chosen from any of those which are well known to one of ordinary skill in the art.

The first plate section 56, the second plate section 58, the first transition section 60, and the second transition section 62 may be formed of a unitary piece of material. As such, the magnetic element support 50 may be integrally formed. In the particular embodiment shown, the first transition section 60 is integrally formed with the second plate section 58. Further, the second transition section 62 may be integrally formed with the first and second plate sections 56, 58 as shown. The second transition section 62 may be curved such as shown. In this embodiment, the second transition section 62 is a smooth C-shape. Other shapes such as a more rectangular cross section may be utilized.

The magnetic element support 50 may be formed of a metal, such as steel. In addition, the magnetic element support 50 may be metal plated. As such, the magnetic element support 50 may be nickel plated with the nickel plating being used to protect the underlying steel from corroding. In the embodiment shown, the first transition section 60 is formed to terminate at a distal end 78. The distal end 78 is faced towards the first plate section 56. Where the magnetic element support 50 is metal plated, it is preferred that the first transition section 60 is formed with a gap (such as 0.3 mm) between the distal end 78 and the first plate section 56. This would allow for distal end 78 to be metal plated. Subsequently, an epoxy may be used to fill such gap to ensure stability between the first transition section 60 and the first plate section 56. The epoxy may be filled with a magnetic metal to facilitate magnetic flow through it.

Figure 7:
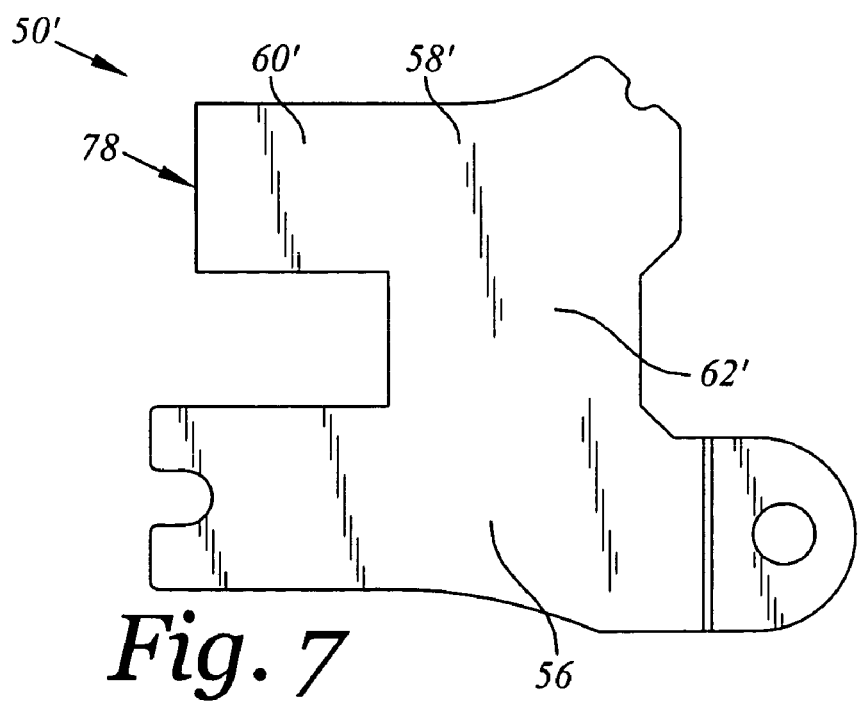
FIG. 7 is a top plan view of the magnetic element support as shown in a un-bended configuration prior to final manufacture.
Figure 8:
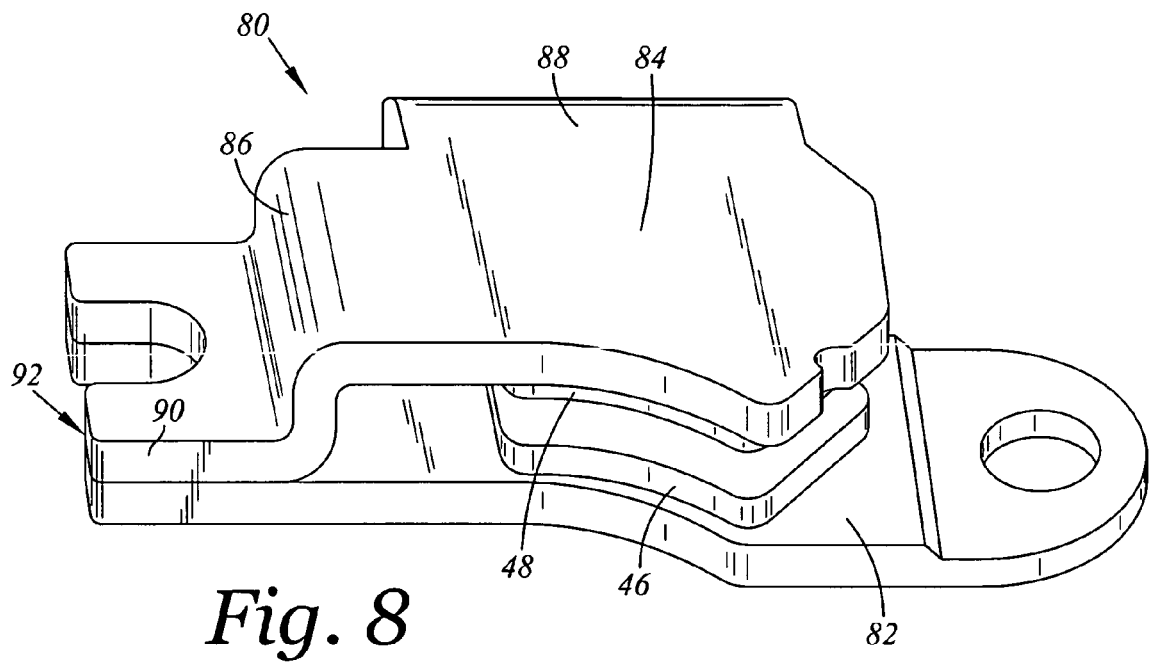
FIG. 8 is an enlarged top perspective view similar to that of FIG. 2, however, of a magnetic element support and the two magnetic elements according to another embodiment.
Figure 8A:
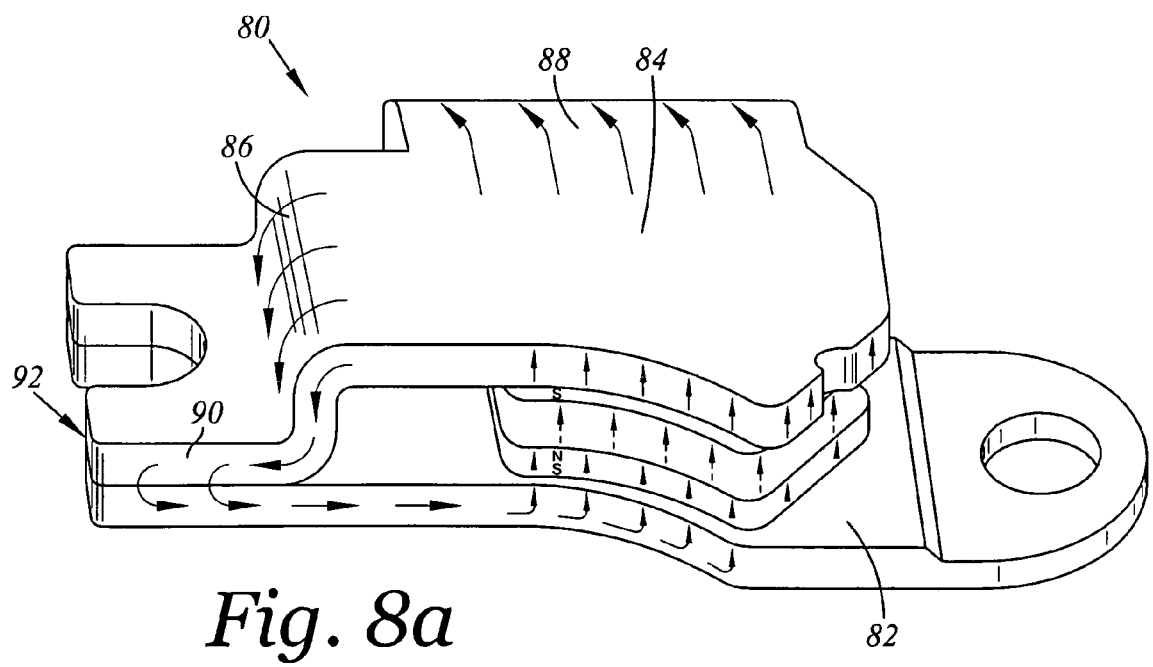
FIG. 8a is the magnetic element support and the magnetic element of FIG. 8 as shown with magnetic flux lines.
Figure 9:
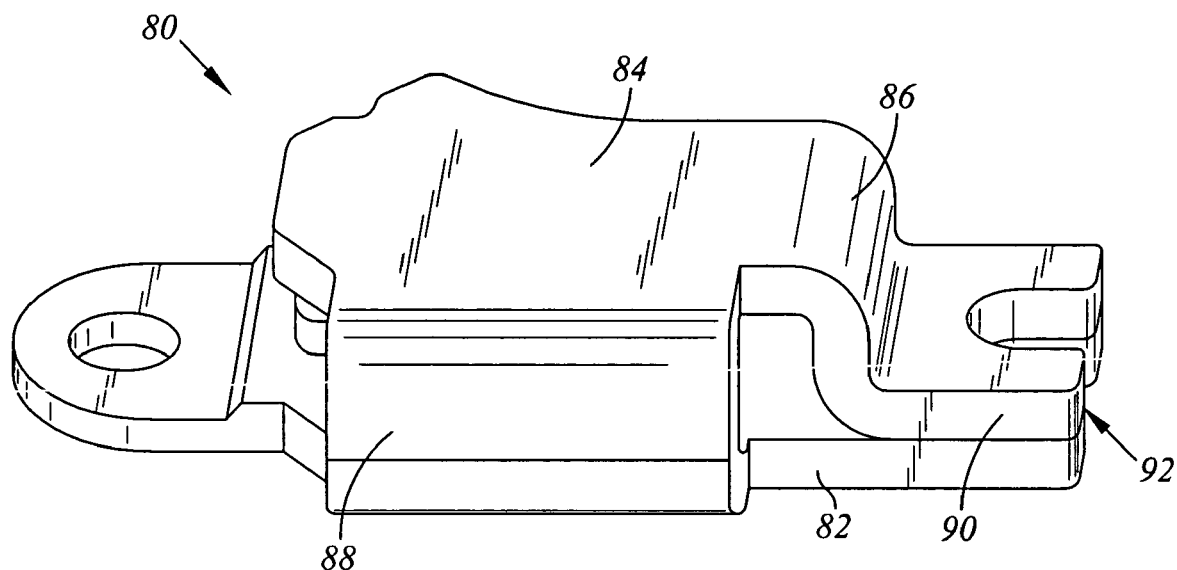
FIG. 9 is the magnetic element support and a magnetic element of FIG. 8 as shown from an opposite viewing angle.
Figure 9A:
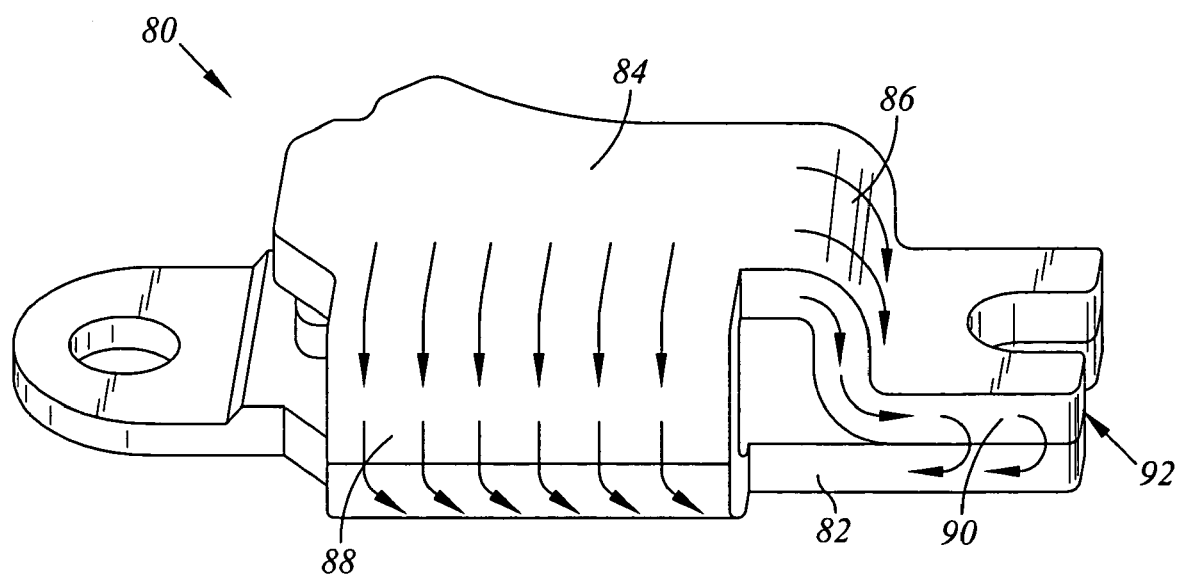
FIG. 9a is the magnetic element support and the magnetic element of FIG. 9 as shown with magnetic flux lines.
Figure 10:
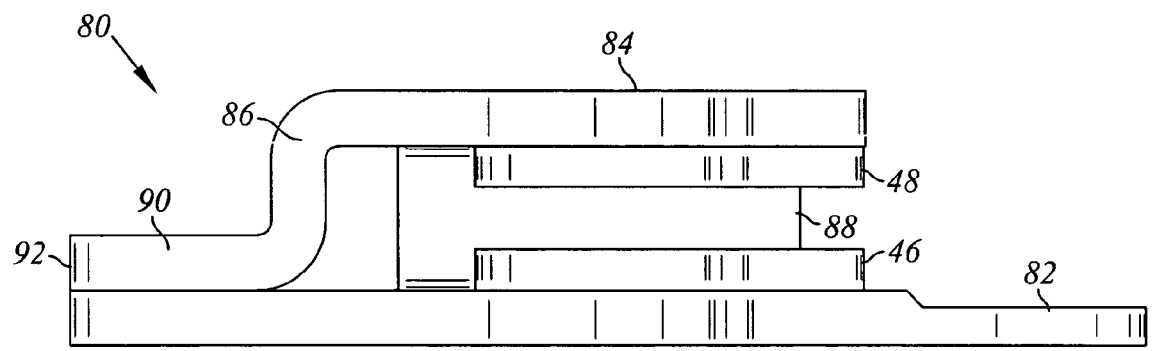
FIG. 10 is a side view of the magnetic element support and the magnetic elements of FIG. 8.
Figure 10A:
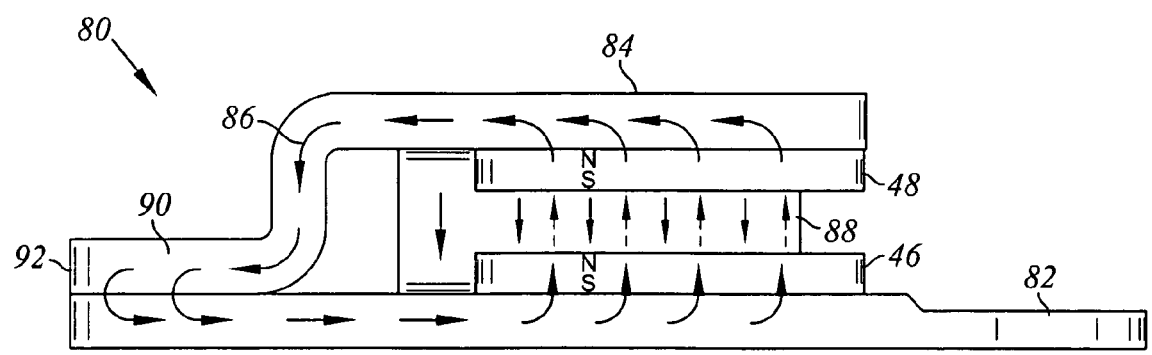
FIG. 10a is the magnetic element support and the magnetic elements of FIG. 10 as shown with magnetic flux lines.
Figure 11:
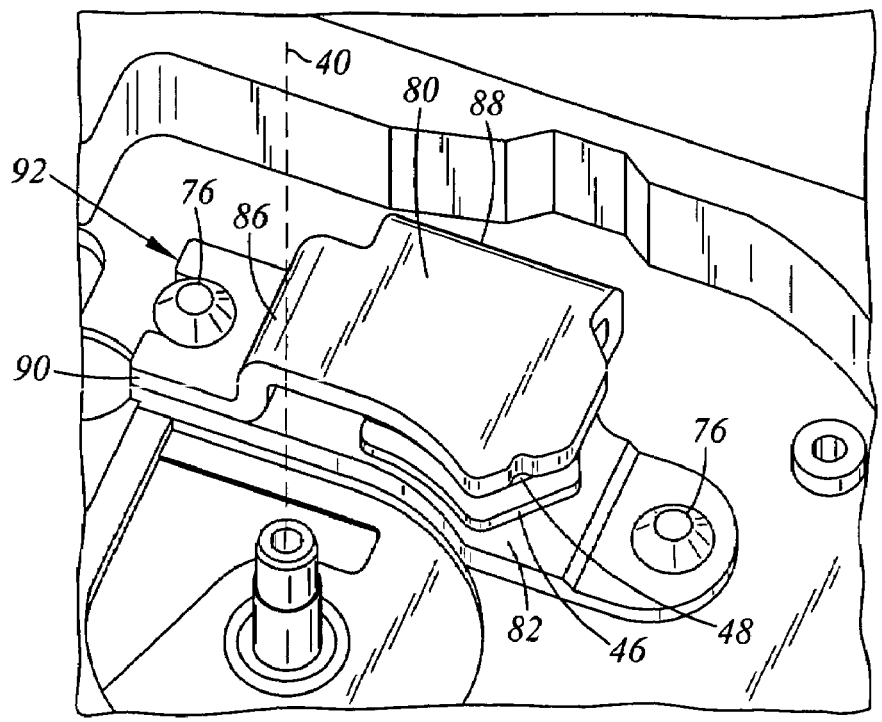
FIG. 11 is an enlarged perspective view of a portion of a disk drive base and magnetic element of FIG. 1 and the magnetic element support of FIG. 8 as installed.
Figure 12:
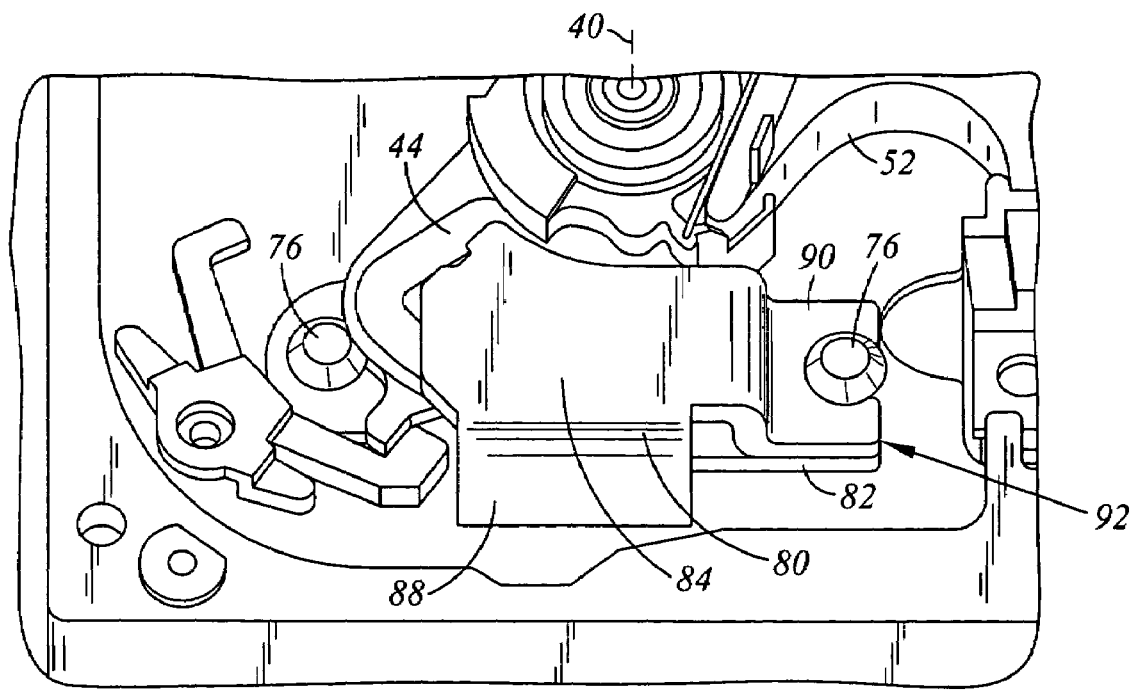
FIG. 12 is an enlarged perspective view of a portion the disk drive base and a portion of a rotary actuator of FIG. 1 and the magnetic element support of FIG. 8 as installed.
Figure 12A:
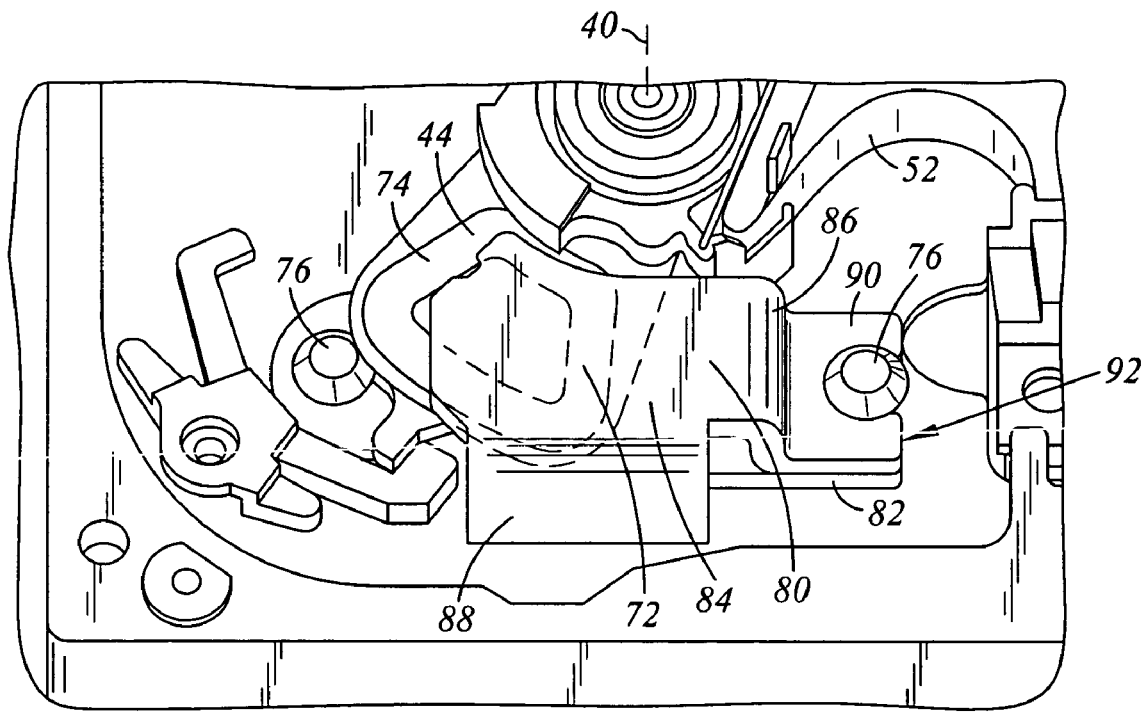
FIG. 12a is the enlarged perspective view of the portion the disk drive base, the portion of a rotary actuator, and the magnetic element support of FIG. 12 with a portion of the rotary actuator shown in phantom lining.

Referring now to FIG. 7 there is depicted a plan view of an un-bended magnetic element support 50' prior to being formed into the magnetic element support 50. In this regard, the un-bended magnetic element support 50' may be formed from a sheet of material, such as a sheet of stainless steel. A stamping process may be used to form the un-bended magnetic element support 50' which is then subsequently bent. The un-bended magnetic element support 50' includes the first plate section 56, a second plate section 58', a first transition section 60' and a second transition section 62'. The second plate section 58', the first transition section 60', and the second transition section 62' are bended to respectively form the second plate section 58, the first transition section 60, and the second transition section 62.

Referring now to FIGS. 8, 8*a*, 9, 9*a*, 10, 10*a*, 11, 12, 12*a*, and 13 there is depicted a magnetic element support 80 according to another embodiment. The magnetic element support 80 is similar to the magnetic element support 50 except as noted. FIGS. 8, 8*a*, 9, 9*a*, 10, 10*a*, 11, 12, 12*a*, and 13 are respectively similar to FIGS. 2, 2*a*, 3, 3*a*, 4, 4*a*, 5, 6, 6*a*, and 7. The magnetic element support 80 includes first and second plate sections 82, 84. First and second transition sections 86, 88 extend between the first and second plate sections 82, 84. In this embodiment, the first transition section 86 extends from the second plate section 84. The first transition section 86 is shown as integrally formed with the second plate section 84. The first transition section 86 includes a contact section 90 that terminates at a distal end 92 with the distal end 92 faced along the first plate section 82 and the contact section 90 faced towards the first plate section 82. In this embodiment, a fastener 76 may be used to secure the first transition section 86 with the first plate section 82 with the contact section 90 disposed against the first plate section 82.

Figure 13:
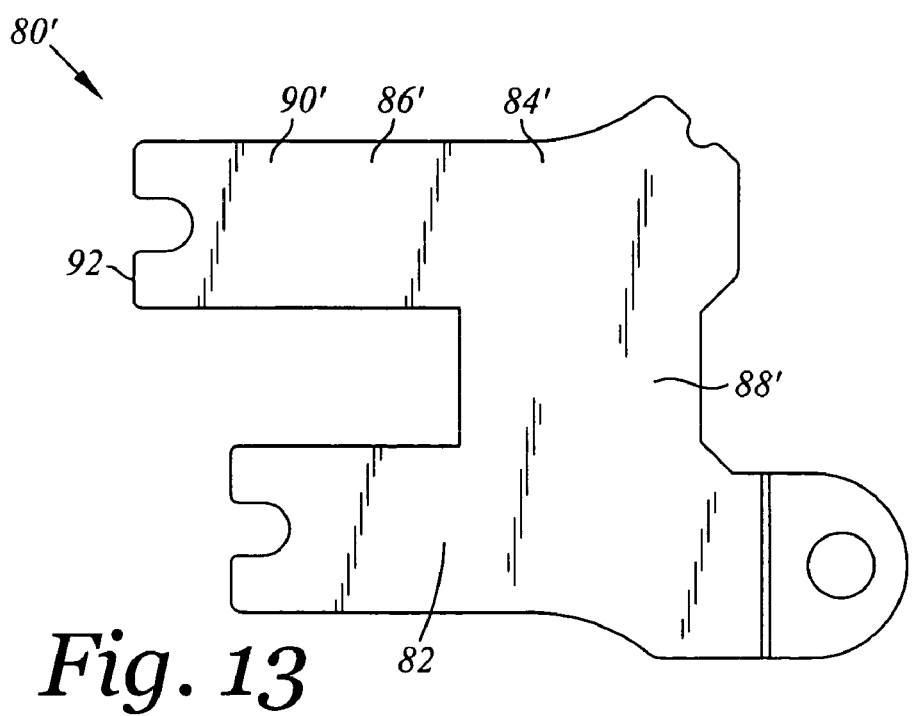
FIG. 13 is a top plan view of the magnetic element support of FIG. 8 as shown in a un-bended configuration prior to final manufacture.

Referring now to FIG. 13 there is depicted a plan view of an un-bended magnetic element support 80' prior to being formed into the magnetic element support 80. In this regard, the un-bended magnetic element support 80' may be formed from a sheet of material, such as a sheet of stainless steel. A stamping process may be used to form the un-bended magnetic element support 80' which is then subsequently bent. The un-bended magnetic element support 80' includes the first plate section 82, a second plate section 84', a first transition section 86' (that includes a contact section 90' and the distal end 92) and a second transition section 88'. The second plate section 84', the first transition section 86', and the second transition section 88' are bended to respectively form the second plate section 84, the first transition section 86, and the second transition section 88.

I claim:

1. A disk drive comprising:
   a disk drive base;
   a disk rotatably coupled to the disk drive base;
   a rotary actuator coupled to the disk drive base adjacent the disk, the rotary actuator being configured to pivot about an axis of rotation, the rotary actuator including a coil; and
   a magnetic element support coupled to the disk drive base, the magnetic element support including:
   a first plate section and a second plate section disposed generally parallel to the first plate section, the first and second plate sections being cooperatively formed to receive the coil between the first and second plate sections;
   a first transition section formed between the first and second plate sections for forming a first magnetic flux path between the first and second plate sections, the first transition section disposed angularly lateral with respect to the coil and the axis of rotation; and
   a second transition section formed between the first and second plate sections for forming a second magnetic flux path between the first and second plate sections, the second transition section being disposed radially beyond the coil with respect to the axis of rotation;
   wherein the magnetic element support is metal plated and wherein the first transition section terminates at a distal end, the distal end facing towards the first plate section, the distal end being separated from the first plate section by a gap.

2. The disk drive of claim 1 wherein the first plate section, the second plate section, the first transition section, and the second transition section are formed of a unitary piece of material.

3. The disk drive of claim 1 wherein the second transition section is integrally formed with the first and second plate sections.

4. The disk drive of claim 1 wherein the rotary actuator further includes a coil support, the coil is supported by the coil support.

5. The disk drive of claim 1 further includes a first magnetic element supported by the first plate section and a second magnetic element supported by the second plate section facing the first magnetic element with the coil disposed between the first and second plate sections.

6. The disk drive of claim 5 wherein the first magnetic element includes two poles, the second magnetic element includes two poles, the first and second magnetic elements have poles with opposite polarities facing each other.

7. The disk drive of claim 1 wherein the magnetic element support is formed of steel.

8. The disk drive of claim 1 wherein the second transition section is C-shaped.

9. The disk drive of claim 1 wherein the gap is filled with an epoxy material.

10. The disk drive of claim 9 wherein the epoxy material includes a magnetic metal filling.

11. The disk drive of claim 1 wherein the metal plating is nickel.

* * * * *